Jan. 30, 1968  C. A. CONNELL  3,365,819
EDUCATION DEVICE
Filed Oct. 23, 1965  2 Sheets-Sheet 1
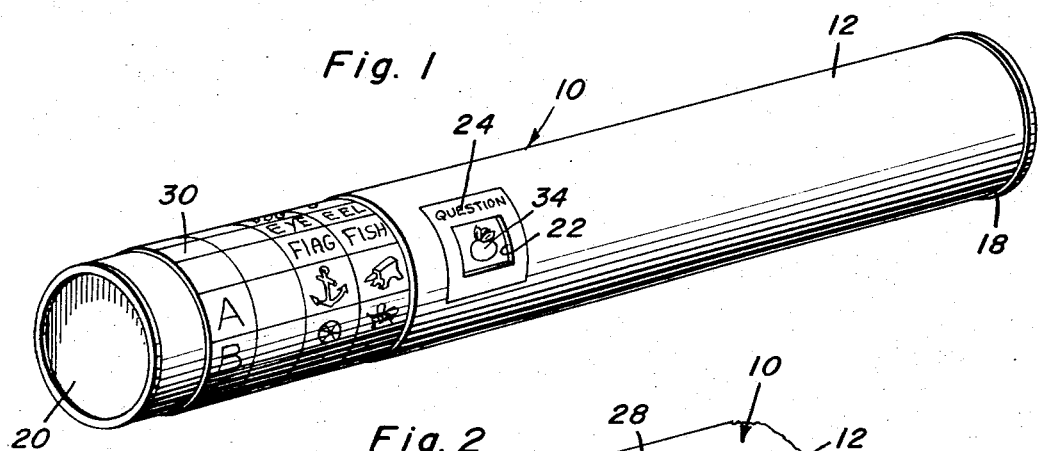
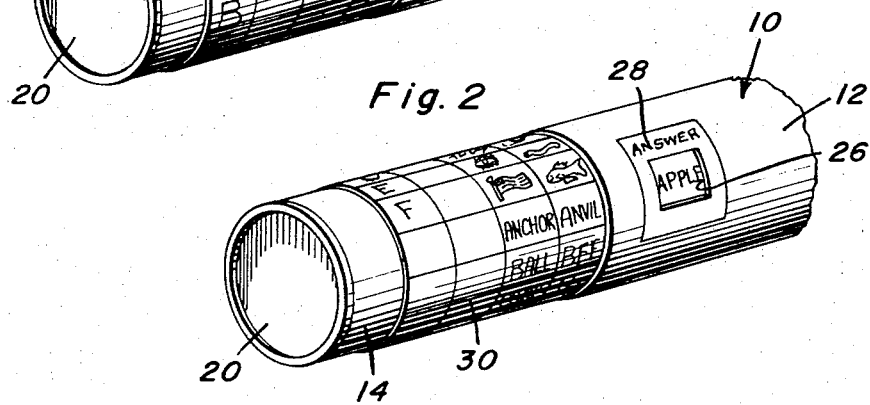
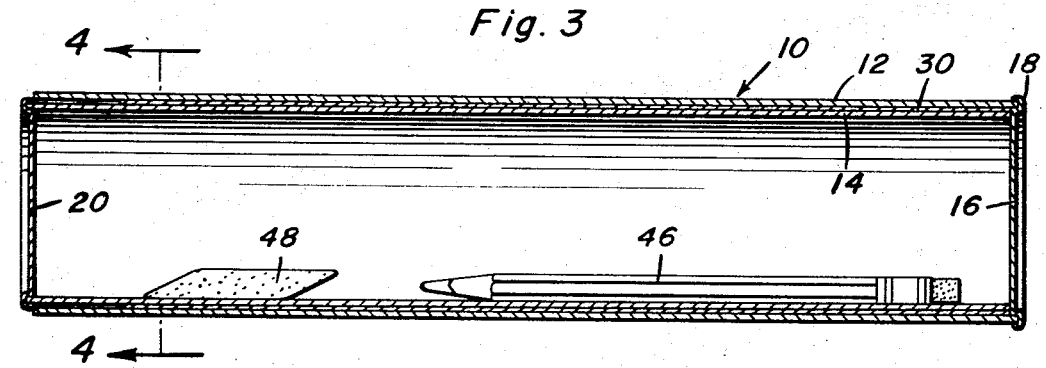
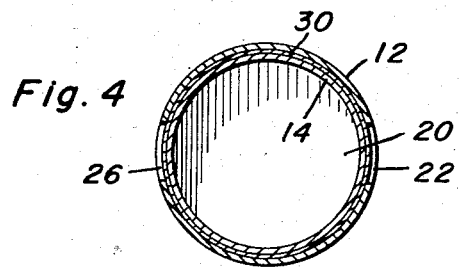
Clyde A. Connell
INVENTOR.
BY
Attorneys Jan. 30, 1968
C. A. CONNELL
3,365,819
EDUCATION DEVICE
Filed Oct. 23, 1965
2 Sheets-Sheet 2
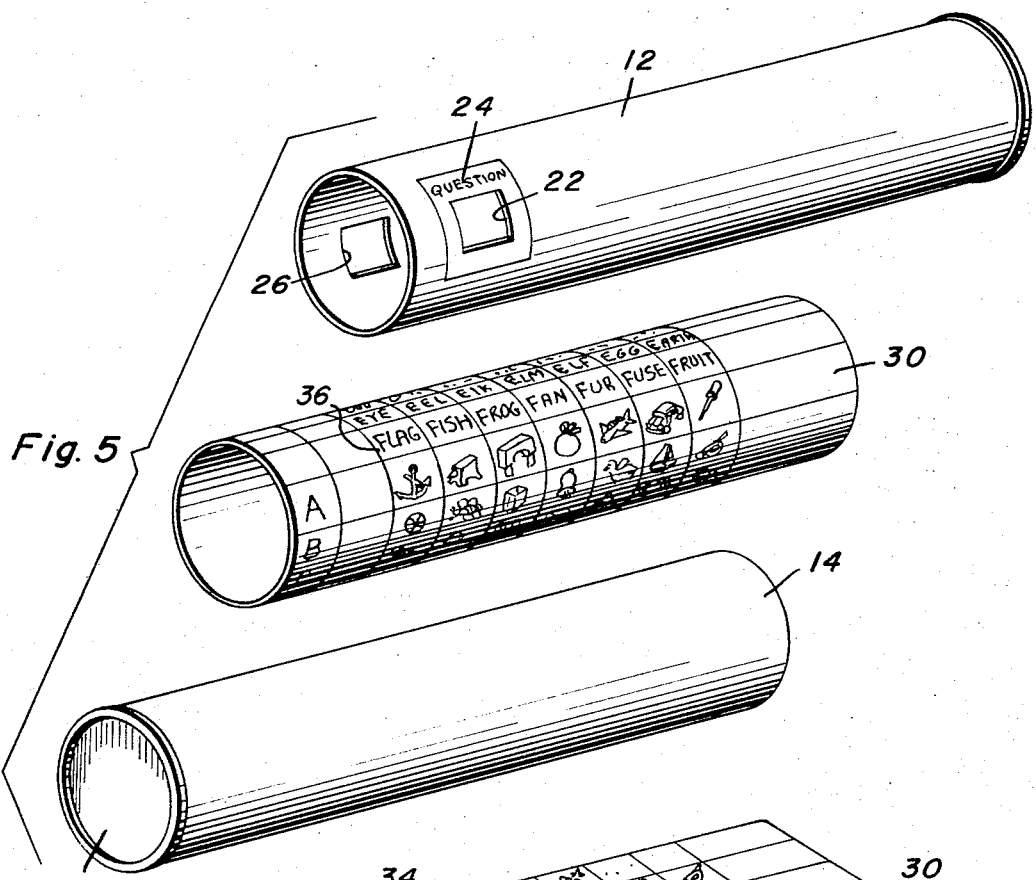
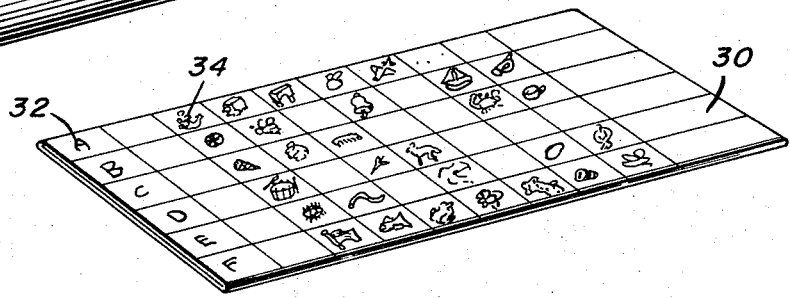
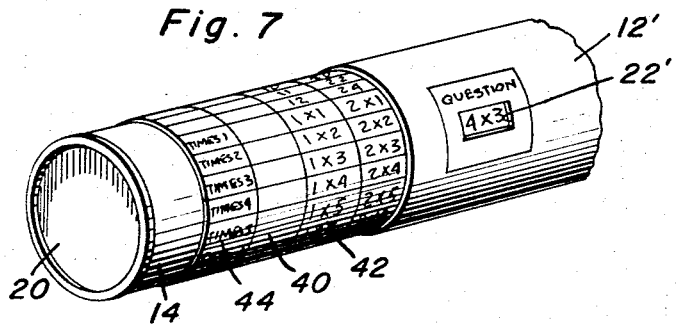
Clyde A. Connell
INVENTOR.
BY *Clarence A. O'Brien*
*and Harvey B. Jacobson*
Attorneys

2

3,365,819
EDUCATION DEVICE
Clyde A. Connell, Tyler, Tex., assignor to
James W. Fair, Tyler, Tex.
Filed Oct. 23, 1965, Ser. No. 502,856
12 Claims. (Cl. 35—77)

ABSTRACT OF THE DISCLOSURE

An instruction aid comprising inner and outer telescopically related members with the inner member having indicia provided therewith and thereabout consisting normally of a series of questions and answers with each question and the corresponding answer being circumferentially spaced. The outer member is provided with a pair of windows circumferentially spaced in the same manner as each question and answer so as to selectively expose, at the same time, the one question and its answer in a manner whereby the exposed answer will not be visible while looking directly at the exposed question, but rather, will only become visible upon a rotation of the members.

---

The present invention generally relates to an education device for use in instructing children in various phases of education such as increasing their vocabulary by the use of alphabetical letter, picture and word association as well as in arithmetic by using various arithmetical tables and the like.

An object of the present invention is to provide an education device employing conventional paper tubes which enable the device to be used as a container for pencils, erasers, rulers and the like for storage of such articles and at the same time enables telescopic and rotational relative movement for manipulating the education device.

Another object of the present invention is to provide an education device having indicia either imprinted directly on one of the paper tubes or provided on a removable cylindrical sleeve so that the range of utility of the device may be greatly widened.

A further object of the present invention is to provide an education device employing a pair of cylindrical telescopic and rotatable tubes in which the outer tube has a pair of windows incorporated therein to reveal portions of the inner cylindrical tube to enable a problem or question to be revealed through one of the windows and a solution or answer revealed through the other window.

A further object of the present invention is to provide an education device in the form of a pair of closely fitting telescopic and rotatable tubular members in the form of conventional paper tubes having at least the outer ends thereof closed in which the indicia employed may be orientated both circumferentially and longitudinally on the inner tube or, in some instances, orientated in a spiral relationship. Various indicia may be associated with the education device depending upon the subject to be taught. For example, in arithmetic or mathematics, various tables such as a multiplication table may be employed along with the resultant answers with the table being printed on one half of the circumference of the inner tube and the answers printed on the other half, so that the observation windows may be orientated in diametrically opposed relation. In word association, a plurality of pictorial illustrations of words beginning with a certain alphabetical letter may be orientated in longitudinal alignment for association with one of the observation windows while the printed word describing the pictured article will be revealed through the other of the windows. Other subjects may be taught in a similar manner by using pictorial illustrations as well as printed descriptions of such pictorial illustrations. By employing a removable sleeve, the device may be employed for a relatively long period of time with the sleeves having progressively more difficult questions and answers thereon or the device may be used for a variety of subjects to be taught by employing sleeves having different indicia thereon.

Yet another object of the present invention is to provide an education device which is quite simple in construction, easy to use, effective for its purposes in teaching children and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the education device illustrating the orientation of the components when a pictorial representation of a word beginning with a particular letter of the alphabet is revealed through one of the observation windows;

FIGURE 2 is a perspective view similar to FIGURE 1 but showing the reverse side of the device illustrating the printed word revealed through the answer window;

FIGURE 3 is a longitudinal, vertical sectional view taken substantially along the centerline of the education device;

FIGURE 4 is a transverse, sectional view taken substantially upon a plane passing along section line 4—4 of FIGURE 3 illustrating the relationship of the cylindrical tube;

FIGURE 5 is an exploded group perspective view illustrating the construction of the outer cylindrical tube, the removable sleeve and the inner cylindrical tube;

FIGURE 6 is a perspective view of one of the sleeves orientated in flattened condition to facilitate their storage; and FIGURE 7 is a partial perspective view illustrating the education device of the present invention with multiplication tables associated therewith.

Referring now specifically to the drawings, the numeral 10 generally designates the education device of the present invention including an outer cylindrical tube 12 and an inner cylindrical tube 14 both of which may be conventional paper tubes such as employed in packaging various items and which are readily available from various paper manufacturers. The internal diameter of the outer tube 12 is only slightly greater than the external diameter of the inner tube 14 so that they are closely associated as illustrated in FIGURES 3 and 4 when telescopically arranged. This association enables the tubes 12 and 14 to be moved longitudinally in relation to each other and also rotated in relation to each other.

The outer end of the outer tube 12 is closed by a closure panel 16 which may be metal, plastic, paper, or the like which is joined to the cylindrical tube 12 in any suitable manner such as by a bead 18 or the like. The outer end of the inner tube 14 is closed in a similar manner by a closure member 20. If more than two tubes are orientated in concentric relation, then the innermost and outermost tubes would be closed. The close fit of the tubes serves as an air trap to retard movement of the tubes and will normally retain the tubes assembled in the event they are held in a vertical position by a child.

The outer cylindrical tube 12 is provided with an observation window 22 which may be in the form of an opening or in the form of a transparent insert to enable observation of indicia placed under the window 22. The window 22 includes indicia 24 associated therewith to indicate that the window 22 is the question or problem window and suitable distinguishable coloring may be provided peripherally of the window 22 to draw attention to this area of the cylindrical tube 12. As illustrated the window 22 is adjacent the end of the tube 12 remote from the closure panel 16 thus enabling substantially the entire length of the inner tubular member 14 to be moved longitudinally and rotatably under the window 22. Diametrically opposed to the observation window 22 is an observation window 26 which may have the same structural features, that is, it may be an opening or a transparent insert and indicia 28 is provided in association therewith to indicate that the observation window 26 is the answer or solution window and suitable distinguishable color may also surround the window 26 if desired.

Mounted on the inner cylindrical tube 14 is a cylindrical sleeve 30 which may be orientated in flattened condition as illustrated in FIGURE 6 and which will slide onto the tube 14 and be held in place thereon by friction and surface attraction or, if desired, suitable means may be provided at the end of the cylindrical tube 14 adjacent the closure 20 for releasably retaining the sleeves 30 in place. Thus, the sleeves 30 may be removed, flattened and stored in a compact condition in a cabinet or the like and used selectively as desired.

The sleeve 30 has alphabetical letters 32 printed thereon in circumferentially spaced relation and in longitudinal alignment therewith, there is a plurality of pictorial illustrations 34 illustrating devices beginning with the particular alphabetical letter with which they are aligned. For example, the letter A has pictorial illustrations of an anchor, anvil, apple and the like. Diametrically opposed to the pictorial illustrations and in the same relative orientation, printed words 36 are provided to describe the pictures designated by the pictorial illustrations 34. FIGURES 1 and 2 illustrate a typical problem set up by a child. With the alphabetical letter A aligned with the window 22, the inner tube 14 has been moved longitudinally outwardly until the pictorial illustration of an apple is revealed under the window 22. Then by rotating the device about its longitudinal axis to reveal the window 26, the printed word "apple" will be observed. Thus, by alphabetical letter, pictorial illustration and printed word association, the child will more rapidly learn words and build up his vocabulary and understand the meanings of such words as he learns the words. As the child progresses in his education, the difficulty of the questions or problems may be increased. In order to retain the indicia sufficiently aligned for easy observation, only a portion of the alphabet will be employed on each sleeve 30. Thus, the sleeve 30 may be provided in groups each group having a portion of the letters of the alphabet thereon with corresponding pictorial illustrations and printed words. Rather than the pictorial illustration being aligned with the alphabetical letters, the words could be aligned with the alphabetical letters and the pictorial illustration would then be observed through the answer window 26.

As illustrated in FIGURE 7, a sleeve 40 has been inserted onto the inner cylindrical tube 14 and the question window 22' may be slightly different in shape from the question window 22 but the remainder of the outside tube 12' would remain the same. The sleeve 40 would have the multiplication table printed thereon with the first circumferential row of indicia 42 including problems with the same multiplicand and a progressively increasing multiplier while the next rows of indicia would have progressively increasing multiplicands. An initial row of indicia 44 is provided which indicates the significance of the longitudinal row of indicia. For example, aligned with the indicia "times 1" would be progressive problems such as "1 times 1, 2 times 1, 3 times 1" and the like. Corresponding answers are provided on the opposite side of the sleeve. This not only illustrates to the child the particular questions and answers but also illustrates visually the ordinate value of numbers inasmuch as the inner tube 14 moves outwardly of the outer tube 12 as the value of the numbers increase.

While the device has been illustrated with the indicia printed on a removable sleeve, it is also within the purview of this invention to have the indicia printed directly on the paper tube. The printing operation may be carried out in any suitable manner and various decorative indicia, coloring or the like may be provided for the device to render it highly attractive to children to increase their desire to use the device. Also, the interior of the cylindrical tubes may be employed for storing pencils 46, erasers 48 and the like thus enabling the device to be used as a pencil box. Various additions and attachments may be provided as deemed appropriate. For example, the closure end of either tube may be removable for access to stored articles and, if desired, a structure may be provided for preventing complete separation of the inner and outer tubes, especially where the inner tube has the indicia printed directly thereon thus preventing children from following their natural tendency to separate structures into component parts.

The education device employs two dimensions of movement which permits the storage of certain information with such information being immediately retrievable for use when desired. By employing more than two tubes, various and rather complex problems and answers may be stored for subsequent use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A device for aiding in teaching children comprising at least a pair of concentrically arranged tubular members orientated in rotatable and longitudinally sliding telescopic relation to each other, the inner of said tubular members having longitudinal and circumferential rows of indicia on one side thereof and additional longitudinal and circumferential rows of indicia orientated in diametrically opposed relation thereto, the outer of said tubular members having a pair of windows formed therein to enable observation of the indicia on the inner tubular member, said windows being diametrically opposed and circumferentially aligned for enabling observation of the particular indicia placed thereunder, the indicia on the inner tubular member including a question at one point on the inner tubular member and an answer in diametrically opposed relation thereto for alignment of the question and answer indicia with the two windows in the outer tubular member.

2. The structure as defined in claim 1 wherein said windows are defined by apertures in the outer tubular member.

3. The structure as defined in claim 1 wherein said tubular members are provided with closed outer ends thereby enabling the telescopically arranged tubular members to provide a storage area for receiving writing implements and the link thereby enabling the device to be used as a pencil box or the like.

4. The structure as defined in claim 1 wherein said inner tubular member is provided with a removable sleeve closely fitting and mounted on the external surface thereof, said indicia being printed on said sleeve for enabling change of indicia.

5. The structure as defined in claim 1 wherein the indicia on the inner tubular member has an alphabetical letter in the initial circumferential row thereof and a plurality of longitudinal rows of pictorial and printed word indicia orientated in diametrically opposed relation to each other and being associated with the windows so that a corresponding alphabetical letter, pictorial illustration and printed word will be observed by a child when the inner tubular member is orientated in a particular relationship to the outer tubular member.

6. The structure as defined in claim 1 wherein said indicia includes a description of a mathematical problem, a visual illustration of the mathematical problem and an answer to that mathematical problem orientated in diametrically opposed relation whereby a child may observe the description of the problem, the problem itself and the solution thereto when the inner tubular member is orientated in a particular orientation.

7. An information supplying device comprising a pair of telescoping cylinders including an inner cylinder movably mounted within an outer hollow cylinder, said outer cylinder including one observation window therein exposing an aligned portion of the inner cylinder, said inner cylinder including information furnishing means provided therewith for selective alignment with said observation window upon a movement of said inner cylinder relative to said outer cylinder, and a second observation window in said outer cylinder, said second window being circumferentially spaced from said first window beyond a direct view field including the first window, thereby necessitating a physical rotation of the outer cylinder to expose the second window.

8. An information supplying device comprising a pair of telescoping members including an inner member movably mounted within an outer hollow member, said outer member including one observation window therein exposing an aligned portion of the inner member, said inner member including information furnishing means provided therewith for selective alignment with said observation window upon a movement of said inner member relative to said outer member, and a second observation window in said outer member, said second window being circumferentially spaced from said first window beyond a view field defined upon a direct viewing of the first window, thereby necessitating a physical rotation of the outer member to expose the second window.

9. A device for aiding in teaching comprising at least a pair of concentrically arranged tubular members orientated in rotatable and longitudinally slidable telescopic relation to each other, the inner of said tubular members having longitudinal and circumferential rows of indicia on one side thereof and additional longitudinal and circumferential rows of indicia orientated in spaced relation thereto, the outer of said tubular members having a pair of windows formed therein to enable observation of the indicia on the inner tubular member, said windows being circumferentially spaced beyond a common direct view field and enabling observation of the particular indicia placed thereunder, the indicia on the inner tubular member including a question at one point on the inner tubular member and an answer in predetermined circumferentially spaced relation thereto for alignment of the question and answer indicia with the two windows in the outer tubular member.

10. The structure as defined in claim 9 wherein said windows are defined by apertures in the outer tubular member.

11. The structure as defined in claim 9 wherein said inner tubular member is provided with a removable sleeve closely fitted thereto, said indicia being printed on said sleeve for enabling change of indicia.

12. The structure as defined in claim 7 wherein said windows are defined by apertures in the outer cylinder.

References Cited

UNITED STATES PATENTS

| | | | |
|---|---|---|---|
| 924,406 | 6/1909 | Walker | 35—774 |
| 2,511,270 | 6/1950 | Kahan | 235—795 |
| 2,659,165 | 11/1953 | Grubola | 35—77 |

FOREIGN PATENTS 26,285   12/1953   Finland.

EUGENE R. CAPOZIO, *Primary Examiner.*

W. H. GRIEB, *Examiner.*